(12) United States Patent
Pederson et al.

(10) Patent No.: US 11,910,818 B2
(45) Date of Patent: Feb. 27, 2024

(54) CEREAL FOOD PRODUCT AND METHOD OF MAKING THE SAME

(71) Applicant: General Mills, Inc., Minneapolis, MN (US)

(72) Inventors: Pamela J. Pederson, Champlin, MN (US); Christine M. Nowakowski, Plymouth, MN (US); Kyle Raney, Shoreview, MN (US)

(73) Assignee: General Mills, Inc., Minneapolis, MN (US)

( * ) Notice: Subject to any disclaimer, the term of this patent is extended or adjusted under 35 U.S.C. 154(b) by 0 days.

(21) Appl. No.: 17/743,699

(22) Filed: May 13, 2022

(65) Prior Publication Data

US 2022/0264918 A1    Aug. 25, 2022

Related U.S. Application Data

(62) Division of application No. 15/049,755, filed on Feb. 22, 2016, now Pat. No. 11,337,445.

(51) Int. Cl.
| | |
|---|---|
| A23L 7/135 | (2016.01) |
| A23P 30/20 | (2016.01) |
| A23P 30/25 | (2016.01) |
| A23L 7/104 | (2016.01) |
| A23L 27/10 | (2016.01) |
| A23L 7/122 | (2016.01) |

(52) U.S. Cl.
CPC .............. *A23L 7/135* (2016.08); *A23L 7/107* (2016.08); *A23L 7/122* (2016.08); *A23L 27/10* (2016.08); *A23P 30/20* (2016.08); *A23P 30/25* (2016.08); *A23V 2002/00* (2013.01)

(58) Field of Classification Search
CPC .......... A23L 7/135; A23L 7/107; A23L 7/122; A23L 27/10; A23P 30/20; A23P 30/25; A23V 2002/00
USPC ........................................................ 426/18
See application file for complete search history.

(56) References Cited

U.S. PATENT DOCUMENTS

| | | | |
|---|---|---|---|
| 3,397,061 A | 8/1968 | Katz | |
| 3,512,992 A | 5/1970 | Cooke et al. | |
| 3,663,369 A | 5/1972 | Morehouse et al. | |
| 3,792,183 A | 2/1974 | Lyall et al. | |
| 4,603,110 A | 7/1986 | Morehouse et al. | |
| 5,015,489 A | 5/1991 | Van Lengerich et al. | |
| 5,093,146 A | 3/1992 | Calandro et al. | |
| 5,200,215 A | 4/1993 | Slade et al. | |
| 5,358,729 A | 10/1994 | Ohkuma et al. | |
| 5,480,669 A | 1/1996 | Zallie et al. | |
| 5,773,056 A | 6/1998 | Hohenthal et al. | |
| 5,843,503 A * | 12/1998 | Clanton | A21C 11/163 |
| | | | 425/97 |
| 5,976,596 A * | 11/1999 | Best | A23L 29/10 |
| | | | 426/654 |
| 6,149,965 A | 11/2000 | Van Lengerich et al. | |
| 6,291,008 B1 | 9/2001 | Robie et al. | |
| 6,521,273 B1 | 2/2003 | Miller | |
| RE43,135 E | 1/2012 | Bojsen et al. | |
| 8,361,235 B2 | 1/2013 | Fosdick et al. | |
| 8,968,816 B2 | 3/2015 | Rassi et al. | |
| 8,993,039 B2 | 3/2015 | Harrison et al. | |
| 2002/0034798 A1 | 3/2002 | Barendse et al. | |
| 2004/0009277 A1 | 1/2004 | Heddleson et al. | |
| 2004/0170751 A1 | 9/2004 | Roy et al. | |
| 2005/0074525 A1 | 4/2005 | Pearce | |
| 2008/0081099 A1 | 4/2008 | Parsons et al. | |
| 2009/0263556 A1 * | 10/2009 | Blondeel | A23G 1/56 |
| | | | 426/631 |
| 2010/0210745 A1 | 8/2010 | McDaniel et al. | |
| 2012/0009299 A1 | 1/2012 | Xie | |
| 2012/0027889 A1 | 2/2012 | Portella | |
| 2012/0288598 A1 | 11/2012 | Leusner | |
| 2013/0071524 A1 | 3/2013 | Barrett et al. | |

FOREIGN PATENT DOCUMENTS

| | | |
|---|---|---|
| CA | 1209842 | 8/1986 |
| CA | 2435599 | 8/2002 |
| GB | 401333 | 11/1933 |

(Continued)

OTHER PUBLICATIONS

NPL Noburo et al. (Machine translation of JP H0779749, 1995). (Year: 1995).*

(Continued)

*Primary Examiner* — Erik Kashnikow
*Assistant Examiner* — Bhaskar Mukhopadhyay
(74) *Attorney, Agent, or Firm* — Diederiks & Whitelaw, PLC; John L. Crimmins, Esq.

(57) ABSTRACT

Cocoa or cinnamon is mixed at least one enzyme to form a mixture, and the mixture is combined with a cereal food composition. In one embodiment, the cereal food composition is extruded or otherwise formed into a plurality of cereal pieces after the mixture is combined with the food composition. In another embodiment, the mixture is coated onto cereal pieces formed from the food composition. Preferably, the at least one enzyme includes at least two carbohydrases, and can also include soluble fiber enzymes, and even one or more fat soluble enzymes. In each case, the at least one enzyme is deactivated, either during working of the cocoa or cinnamon after combining with the cereal food composition or prior to the mixture being combined with the cereal food composition.

17 Claims, 5 Drawing Sheets

(56) References Cited

FOREIGN PATENT DOCUMENTS

JP          58129948        8/1983
JP         2013252114      12/2013
WO    WO-2012095121 A1 *   7/2012   .............. A23G 1/32

OTHER PUBLICATIONS

NPL Kim et al. (in Applied Biological Chem. 37(4): 272-276, 1994: English version of the Abstract has been considered). (Year: 1994).*
Noburo et al., Machine translation of JP H0779749, 1995.
Kim et al., "*Changes in Properties in Cinnamon Extracts Prepared by Enzyme Hydrolysis and Addition of Salts, Sugars and Antioxidant Synergists*", Applied Biological Chemistry, Vol. 37, N0. 4, pp. 272-276, 1994.
Anonymous, "*Viscozyme L Cellulolytic Enzyme Mixture*", retrieved from the Internet, https://www.sigmaaldrich.com/catalog/product/sigma/v2010?land=en&region=NL&gelid=EAIaIOohChMIvcmx6L6Y5AIVGeJ3Ch0qHA1zEAAYASAAEgKfTPD_BwE, Aug. 23, 2019.
Sammartino, "*Enzymes in Brewing*", MBAA TQ, Vol. 52, No. 3, pp. 156-164, Jan. 1, 2015.

* cited by examiner

CEREAL FOOD PRODUCT AND METHOD OF MAKING THE SAME

CROSS-REFERENCE TO RELATED APPLICATIONS

This application represents a divisional application of U.S. patent application Ser. No. 15/049,755 entitled "Cereal Food Product and Method of Making the Same" filed Feb. 22, 2016, pending. The entire content of this application is incorporated herein by reference.

BACKGROUND OF THE INVENTION

The present invention pertains to cereal food products, such as ready-to-eat (RTE) cereal pieces, and, more particularly, to making food products with certain natural ingredients, such as cocoa or cinnamon, while also taking measures to enable the effective use of such ingredients.

When producing food products, it is important that the component ingredients, as well as any ingredient mixtures, are not so viscous or sticky as to cause production difficulties. Certainly, it is important that the ingredients and mixtures thereof are not so viscous as to clog the machines (e.g., extruders) and pipes through which they pass as such clogs can lead to the shutdown of production lines, thereby increasing costs and potentially reducing the amount of product that can be produced. Also, when intermediate products are placed on a dryer belt, for example, the stickiness of these products can lead to build up or fouling. Unfortunately, some otherwise desirable ingredients, and mixtures containing these ingredients, are sufficiently viscous or sticky so as to cause difficulties during production. For instance, both cocoa and cinnamon increase viscosity and stickiness when used in food products. As a result, in certain food products, it has generally been infeasible to include significant amounts of cocoa, cinnamon or both natural ingredients.

These production issues have also made it difficult to remove or reduce the amount of other ingredients. For example, in order to meet health-related metrics, the amount of sugar used in many food products has been reduced, which has had the effect of making processing the overall products more difficult as the sugar acts as a lubricant during processing. Also, certain artificial ingredients, such as artificial food coloring, are commonly employed when producing a wide range of food products. Increasingly, there has been a desire to reduce the use of such ingredients. However, when it is desired to remove artificial coloring for example, it is not as simple as replacing the artificial coloring with a non-artificial (i.e., natural) ingredient when making a food product having the color expected by the consumer, particularly if the same productions lines are to be used with the new formulation. Instead, the use of natural coloring ingredient can lead to a host of problems. For instance, natural coloring ingredients such as cocoa and cinnamon alter the viscosity and stickiness of the formulation so as to cause difficulties during production.

Due to various constraints, it is not always feasible to reduce the viscosity of ingredients by conventional means, e.g., by simply adding additional water. Accordingly, and in view of the above, it would be desirable to provide further ways of reducing the viscosity and/or stickiness of certain ingredients, thereby enabling the addition or increased use of these ingredients or the reduction of removal of other ingredients with current production equipment.

SUMMARY OF THE INVENTION

The present invention is directed to cereal food products, such as dough based cereal pieces or marbits, as well as a method of making the cereal food products. More specifically, the invention is concerned with making a cereal food product with cocoa or cinnamon, wherein the cocoa or cinnamon is pre-treated with one or more enzymes in order to control the viscosity or stickiness of the overall formulation. In particular, the cocoa or cinnamon is treated or combined with multiple enzymes to form a mixture that is later combined with an intermediate cereal food composition in forming the cereal food product.

In one particular embodiment, a dough based cereal food composition is produced by mixing a plurality of ingredients to form a cereal dough. The plurality of ingredients includes at least water, syrup and grains or grain flour. The cocoa or cinnamon is mixed with at least one enzyme to form a mixture, and the mixture is combined with the cereal dough or coated on cereal pieces formed from the cereal dough. In one embodiment, the mixture is combined with the cereal dough and then the cereal dough is formed into the food product. In another embodiment, the cereal dough is formed into pieces and then the mixture is sprayed onto the cereal pieces as a coating slurry. In another embodiment, the cereal pieces are constituted by marbits.

In a preferred form, the at least one enzyme includes at least two carbohydrase, but can also include additional, soluble fiber enzymes and even or more fat soluble enzymes. In certain preferred embodiments, these various enzymes include cellulase, xylanase, pectinase, protease and lipase. In each case, mixing the cocoa or cinnamon with the at least one enzyme reduces the viscosity of the mixture by reducing a carbon chain length of or hydrolyzing the cocoa or cinnamon. The at least one enzyme is deactivated prior to the mixture being combined with the cereal food composition, i.e., mixed with the cereal food composition for further processing or coated on the cereal food composition after the composition has been made into a plurality of cereal pieces.

Additional objects, features and advantages of the invention will become more readily apparent from the following detailed description of preferred embodiments thereof when taken in conjunction with the drawings wherein like reference numerals refer to common parts in the several views.

DETAILED DESCRIPTION OF THE PREFERRED EMBODIMENTS

A wide variety of food and snack products are prepared from cooked cereal doughs, including ready-to-eat (RTE) or breakfast cereals. Generally, in the preparation of cooked cereal dough, cereal or farinaceous ingredients, such as various cereal flours, are first admixed with other dry ingredients, such as salt, minerals, starch and sugars, to form a dry blend of ingredients. This dry blend is then further blended with various liquid ingredients (including water), heated and worked to gelatinize or cook the starch fraction of the cereal ingredients and other starchy materials. A wide variety of blending, cooking and working apparatuses and techniques are known in the art. More recently, the preparation of cooked cereal dough using a cooker extruder, especially a twin-screw extruder, has become commonplace. The cooked cereal doughs so prepared can be processed to form finished products of various sizes, textures and shapes. Typically, a post-cooking cereal dough formation step involves forming suitably sized and shaped individual pieces, such as shreds, flakes, biscuits or puffs. Thereafter, the finished dried cereal base pieces can have a topical coating applied thereto in order to provide desired taste and texture attributes. For instance, in the preparation of a breakfast cereal, the topical coating can include a sugar coating.

Of particular interest to the present invention is the production of RTE cereal products. With initial reference to FIG. 1, a portion of a production arrangement for preparing RTE cereal in accordance with an embodiment of the present invention is shown. Cereal ingredients 100-102, as well as a natural food coloring ingredient 103, are supplied to a cooker extruder 105 to form a cooked cereal dough. Although not shown, cooker extruder 105 can be defined by an Archimedes-type single- or twin-screw extruder that is driven by a motor 110. Motor 110 is linked through a communication line 115 to a controller (or control system) 120. Cereal ingredients 100-102 can take the form of a wide range of cereal components suitable for cooking and extrusion. By way of example, cereal ingredient 100 is a dry, processed starchy cereal ingredient, cereal ingredient 101 is a syrup and cereal ingredient 102 is water.

Figure 1:
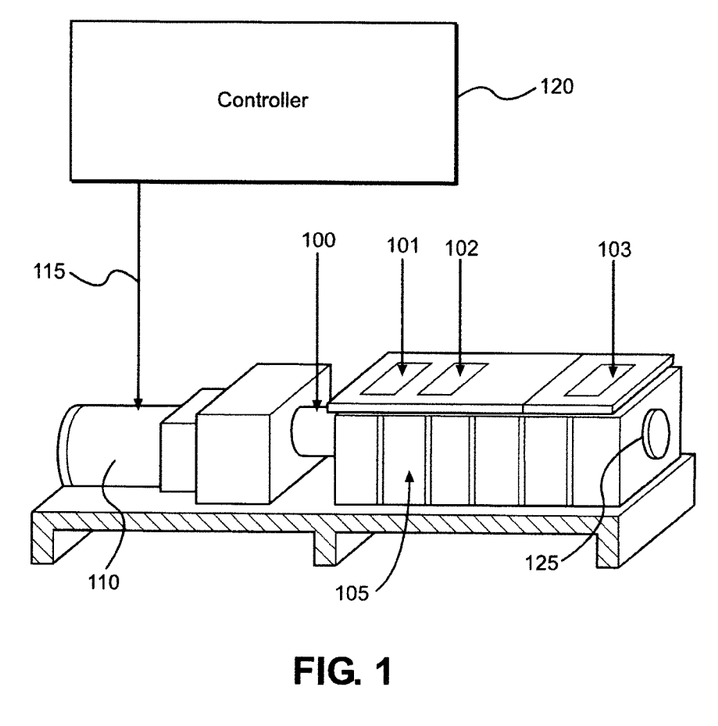
FIG. 1 is a schematic illustration of a portion of a process for producing a ready-to-eat (RTE) cereal product in accordance with the invention.

For the sake of completeness, it should be noted that cereal ingredient 100 can take many forms known in the art, such as being formed with appropriately sized particles of whole grains supplied by any of the major cereal grains including wheat, corn (maize), oats, barley, rye, rice and mixtures thereof. In one form, cereal ingredient 100 has only fine particles so as to constitute a cereal flour. Cereal ingredient 100 can comprise about 40 to 99% (dry basis) of the cooked cereal dough. In terms of organoleptic attributes and reductions in RTE cereal piece frangibility, better results are obtained when cereal ingredient 100 comprises about 75 to 99% of the cooked cereal dough. Cereal ingredient 100 can also include various minor ingredients or additives such as sugar(s), salt and mineral salts (e.g., trisodium phosphate) and starches that can be conveniently pre-blended with the other portions of cereal ingredient 100. Cereal ingredient 101 can be constituted by various liquid ingredients, such as corn (maize) or malt syrups or the like. The amount of moisture from cereal ingredients 101 and 102 will depend on various factors including the particular cereal ingredients, cooking temperature and working techniques employed. The moisture content of the cooked cereal dough typically ranges from about 20 to 30% prior to the cooked cereal dough exiting cooker extruder 105.

If desired, the cereal dough can additionally comprise, by dry weight, about 0.1 to 20%, particularly about 0.5 to 5%, sugar(s) or, synonymously herein, nutritive carbohydrate sweetening agents. Such materials are also well known in the RTE cereal art. One sugar component useful herein is sucrose. However, the sugar component can alternatively comprise fructose, maltose, dextrose, honey, fruit juice solids, brown sugar and the like. In addition to providing desirable sweetness, the sugar component also beneficially affects the cereal color and texture. Conveniently, the sweeteners can be added in with cereal ingredient 100 or cereal ingredient 101. If desired, the cereal dough composition can additionally include a variety of materials designed to improve the aesthetic, organoleptic or nutritional qualities of the cereal. These adjuvant materials can include vitamin or mineral fortification, colors, flavors, high potency sweeteners and mixtures thereof. The precise concentration of such ingredients can certainly vary. Generally, however, each of these ingredients can comprise about 0.01 to 2% dry weight of the cereal composition. One especially useful material is salt (i.e., table salt or common salt).

Figure 2:
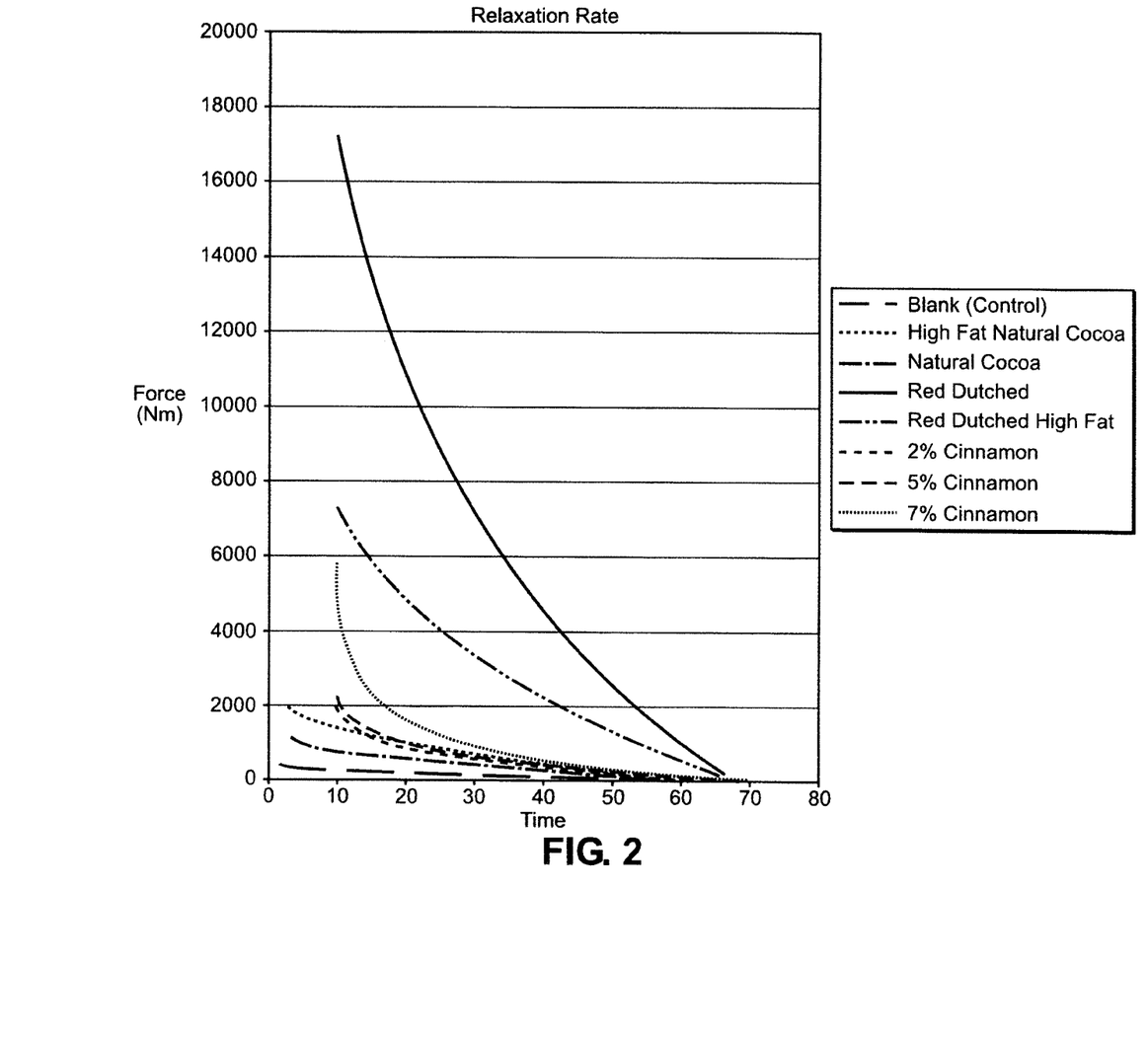
FIG. 2 is a graph of relaxation rate over time for several candy samples.
Figure 3:
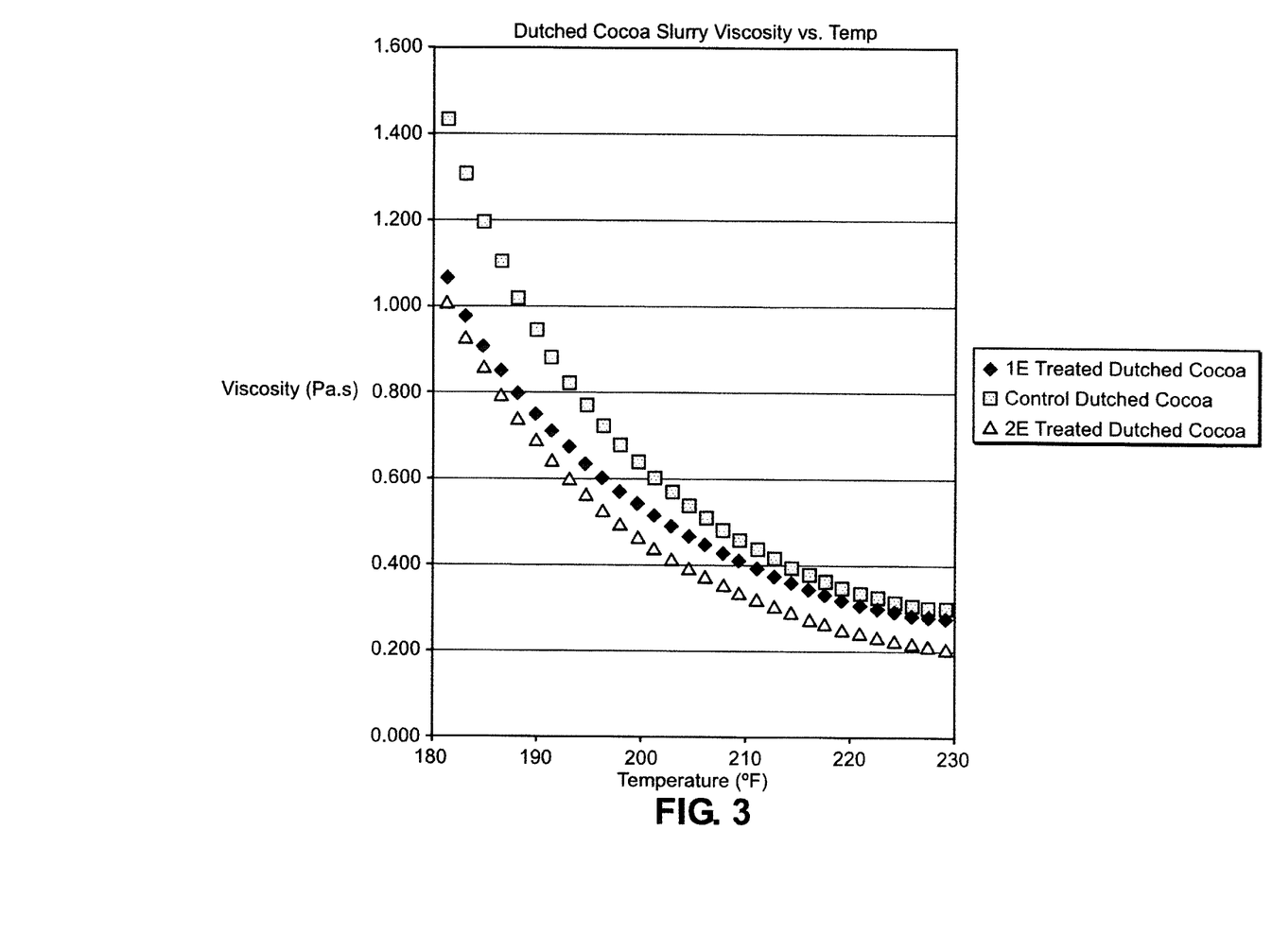
FIG. 3 is a graph of slurry viscosity versus temperature for treated and untreated cocoa slurries.

Important with respect to the present invention is the addition of natural coloring ingredient 103, specifically the use of cocoa or cinnamon as natural food coloring ingredient 103 since cocoa and cinnamon are two non-artificial ingredients that can be advantageously used to impart color, as well as flavor, to a food product. Unfortunately, adding either cocoa or cinnamon to a cereal slurry will significantly increase the overall viscosity and stickiness of the cereal formulation or composition. This problem is illustrated by FIG. 2 which shows the results of a texture analysis. Specifically, samples having different formulations of sugar, water, canola oil, corn syrup and cocoa or cinnamon were prepared. The ingredients were boiled on a stovetop, and the liquid was poured into molds to harden and form a candy or confectionary phase. These candies were then subjected to a texture analysis. As can be seen in FIG. 3, the addition of cocoa or cinnamon increased the toughness of the candies (i.e., made the candies less brittle). This indicates that the addition of cocoa or cinnamon will increase the viscosity and stickiness of a cereal slurry. As a result, adding or increasing the amount of these ingredients can cause production difficulties, such as the clogging of machines or pipes, specifically cooker extruder 105, as well as build up on or fouling of a dryer belt.

Figure 4:
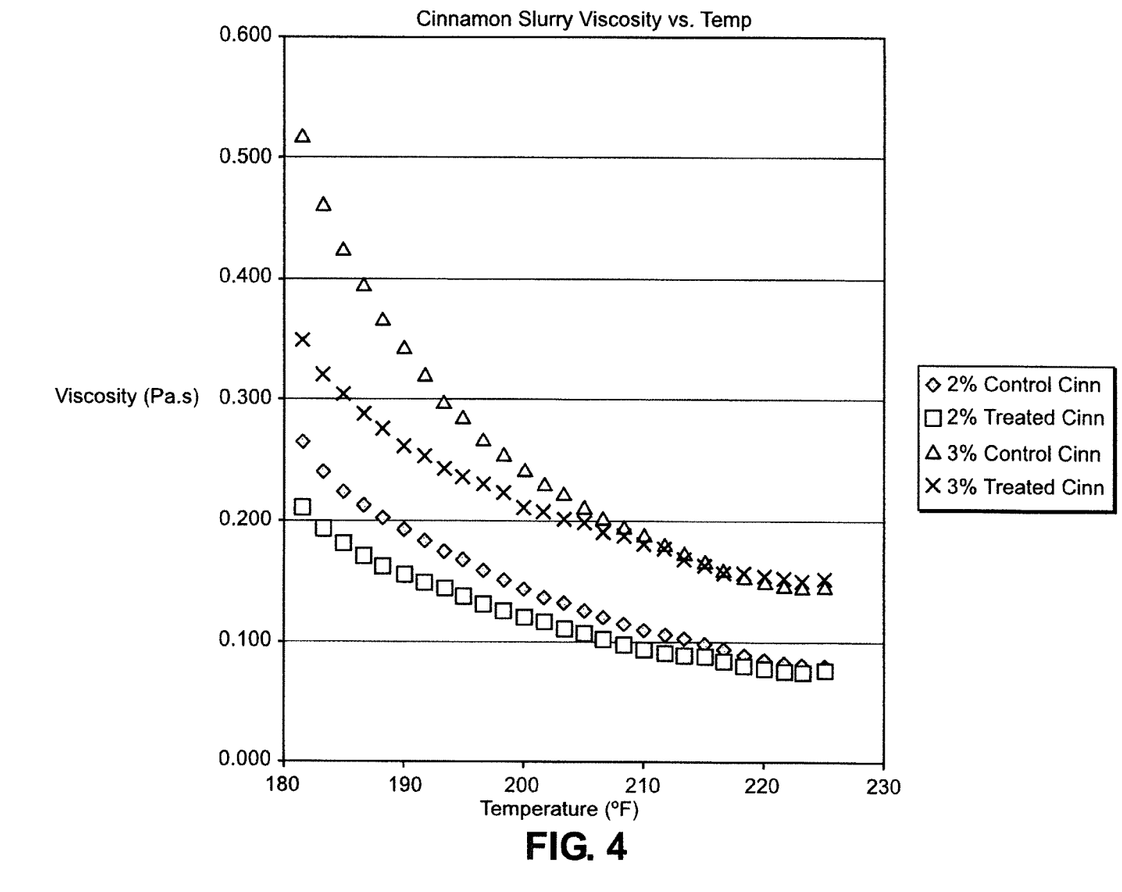
FIG. 4 is a graph of slurry viscosity versus temperature for treated and untreated cinnamon slurries.

To address these concerns, the present invention involves treating natural coloring ingredient 103, i.e., the cocoa and/or cinnamon, with enzymes to reduce the viscosity of ingredient 103, thereby reducing the viscosity of slurries containing ingredient 103 without negatively affecting the flavor of the resulting RTE cereal products. Without being bound to any particular theory, the enzymes function to reduce carbon chain lengths and cause hydrolysis of the natural coloring ingredient 103. In connection with both cocoa and cinnamon, the treatment includes the use of particular enzyme combinations. That is, some common enzymes and different combinations of enzymes were found to be significantly more effective for treating cocoa and cinnamon, and not all enzymes and enzyme combinations can be used to effectively treat these ingredients. Also, even among the enzymes and enzyme combinations that are effective, the effectiveness varies. In somewhat generic terms, a combination of at least two carbohydrases and at least one soluble fiber enzyme were found to be particularly effective and, at least in the case of cocoa, at least one additional fat soluble enzyme. In terms of the specific enzymes, the following enzyme combination was found to be particularly beneficial in connection with cocoa: cellulase, xylanase, pectinase and protease (including at least neutral and alkaline protease). For cinnamon, the following enzyme combination was found to be particularly beneficial: cellulase, xylanase, and pectinase. To test the effectiveness of these treatments, cocoa and cinnamon were treated with enzymes and incorporated into cereal slurries. FIG. 3 is a graph of slurry viscosity versus temperature for treated and untreated cocoa slurries, while FIG. 4 is a graph of slurry viscosity versus temperature for treated and untreated cinnamon slurries. As can be in these figures, the slurries containing treated cocoa or cinnamon are less viscous than the slurries containing untreated cocoa or cinnamon over much of the temperature range shown. The viscosity difference is particularly significant at the lower end of the temperature range. These results are reproduced in part in Table 1, which provides the viscosities of the slurries at 220° F.

TABLE 1

| Variable | Viscosity at 220° F. (Pa · s) | Viscosity Reduction (%) |
| --- | --- | --- |
| Red Dutched Control | 0.351 | 0 |
| 1E Treated Cocoa | 0.321 | 3 |
| 2E Treated Cocoa | 0.255 | 9.6 |
| 2% Cinnamon Control | 0.085 | 0 |
| 2% Treated Cinnamon | 0.078 | 0.7 |
| 3% Cinnamon Control | 0.151 | 0 |
| 3% Treated Cinnamon | 0.156 | −0.5 |

In a particular formulation of the cocoa enzyme combination, the carbohydrases and pectinase makes up 50% of the combination while the protease makes up the remaining 50%. The cellulase and xylanase have been determined to be the most important portions of the cocoa and cinnamon enzyme combinations in reducing the carbon chain length or hydrolyzing, with the xylanase acting as a catalyst for the cellulase. When cocoas having higher fat contents are used (e.g., 20-22% fat), it was found that the addition of lipase to the enzyme combination is further beneficial in connection with reducing the carbon chain length or hydrolyzing.

Figure 5:
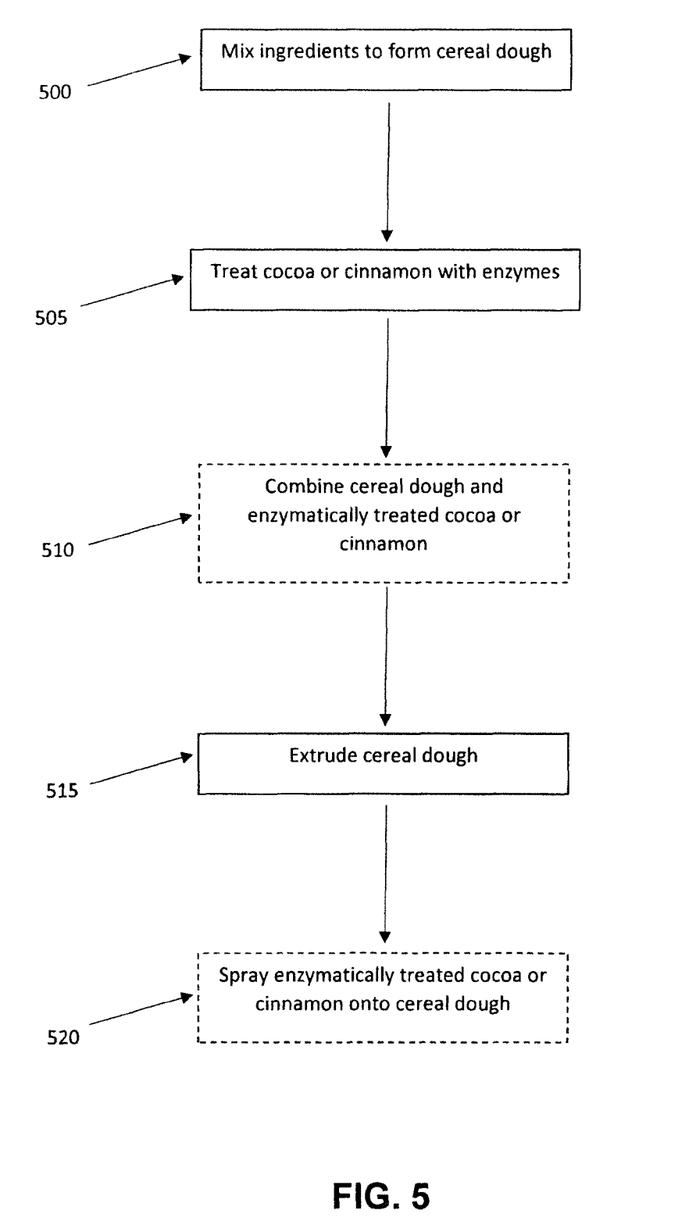
FIG. 5 is a flowchart of a process employed in connection with producing the RTE cereal product in accordance with the invention.

FIG. 5 is a flowchart illustrating a portion of a process for producing RTE cereal products in accordance with the present invention. At step 500, a plurality of ingredients is mixed together in cooker extruder 105 to form a cereal dough, the plurality of ingredients including at least water, a syrup and grains or grain flour. At step 505, cocoa or cinnamon is mixed with at least one enzyme in order to reduce a carbon chain length of or hydrolyze the cocoa or cinnamon. In one exemplary enzymatic treatment process, water is heated to 50° C., and the chosen enzymes are added to the water. Preferably, the enzymes are added in an amount equal to about 5% of the weight of the cocoa or cinnamon to be added (i.e., 12.5 g of enzymes per 250 g of cocoa or cinnamon), and 8 parts water is used to 2.5 parts cocoa or cinnamon (i.e., 800 g of water per 250 g of cocoa or cinnamon). Once the enzymes are mixed with the water, the cocoa or cinnamon is gradually added until all of the cocoa or cinnamon is in solution. The mixture is then maintained at 50° C. for 10 minutes. Afterwards, the mixture is heated to 82° C. and held for 20 minutes to deactivate the enzymes. At this point, the mixture can be placed in a container and refrigerated or frozen until use when it will be pumped to cooker extruder 105 as coloring ingredient 103. Alternatively, the mixture is not stored in a refrigerator or freezer after it is made but is instead pumped directly to cooker extruder 105. In either case, coloring ingredient 103, i.e., the enzymatically treated cocoa or cinnamon, is added to the cereal dough in step 510. Then, at step 515, the cereal dough is extruded. In an alternative embodiment, at step 520, the enzymatically treated cocoa or cinnamon is sprayed, such as from a slurry tank (not shown), onto the cereal dough as a coating or part of a coating after the cereal dough is extruded or otherwise formed in step 515. Typically, the coating is a semisolid mixture that acts as a sugar coating for the cereal dough, which is generally formed into shreds, flakes, biscuits or puffs at this stage. Although there are many potential ingredients, the coating can include water, sugar, syrups and oil. While the preferred embodiment described above involves deactivating the enzymes before the mixture is added to the cereal dough, it is also possible to add coloring ingredient 103 with the enzymes earlier in the cooking process, such that the enzymes are actually deactivated during the cooking of the cereal dough or heating of the coating slurry. In addition, while step 500 is shown taking place prior to step 505, these steps can take place simultaneously or in reverse order.

Certainly, the present invention can be employed in connection with making a wide range of RTE cereal products, including cereal dough based cereal pieces, marbits or the like, with the enzymatically treated cocoa and cinnamon being added directly to an intermediate cereal food composition or applied as part of a coating to cereal pieces made from the cereal food composition. It should be noted that the viscosity issues associated with adding cocoa or cinnamon in connection with making marbits, in addition to the same increased pressure and material pumping problems created in making other cereal pieces, were actually found to even prevent the marbits from foaming. While portions of the above discussion have focused on adding additional cocoa or cinnamon to a cereal food product to impart color, these ingredients can also be added to a colored food product simply to impart cocoa or cinnamon flavor. For food products that already contain chocolate or cinnamon, the amount of these ingredients can be increased. Otherwise, chocolate and/or cinnamon can potentially be added to a new or existing formulation. In addition, the amount of cocoa or cinnamon can be maintained while the amount of sugar is reduced, with the treatment of the cocoa or cinnamon advantageously mitigating the increased viscosity issues due to solubility caused by the sugar reduction.

Based on the above, it should be apparent that either adding or increasing the amount of cocoa or cinnamon in an operational product stream can cause production difficulties. In fact, even maintaining existing amounts of cocoa and cinnamon can be difficult if the amounts of one or more other ingredients are modified, e.g., if the amount of sugar is reduced. Although it is possible to replace or upgrade existing equipment or rework cereal formulations, such options may be impractical, expensive and/or otherwise undesirable. However, the present invention provides a way to reduce the viscosity and stickiness of cereal food product ingredients and ingredient mixtures, thereby preventing clogging or fouling of machinery and pipes during production of the cereal food product. Accordingly, the enzymatic treatment described above alleviates the problems caused by the use of relatively more viscous ingredients and allows cereal food products to be produced with natural ingredients, reduced sugar content, increased amounts of cocoa or cinnamon or even the use of both cocoa and cinnamon, for example. Although described with reference to preferred embodiments, it should be readily understood that various changes or modifications could be made to the invention without departing from the spirit thereof.

The invention claimed is:
1. A cereal food product comprising:
   a cereal composition;
   cocoa; and a mixture of at least one enzyme and the cocoa, wherein the at least one enzyme includes a carbohydrase and at least one fat soluble enzyme, wherein the at least one enzyme including the at least one fat soluble enzyme is present as a deactivated enzyme.

2. The cereal food product of claim 1, wherein the at least one deactivated enzyme constitutes cellulase and xylanase.

3. The cereal food product of claim 1, wherein the at least one deactivated enzyme further includes at least two soluble fiber enzymes.

4. The cereal food product of claim 3, wherein the at least two soluble fiber enzymes include pectinase and protease.

5. The cereal food product of claim 1, wherein the at least one fat soluble enzyme constitutes lipase.

6. The cereal food product of claim 3, wherein the at least one deactivated enzyme constitutes cellulase, xylanase, pectinase, protease and lipase.

7. The cereal food product of claim 1, wherein the cereal food product is cereal dough, or a cereal piece made from cereal dough.

8. The cereal food product of claim 7, wherein the cereal food product is the cereal piece and wherein the mixture forms a coating provided on the cereal piece.

9. The cereal food product of claim 7, wherein the cereal food product is a cereal piece and wherein the cereal piece is a marbit.

10. A cereal food product comprising:
a cereal composition including a plurality of cereal pieces; and
a mixture including at least one of cocoa and cinnamon and at least two enzymes including at least two carbohydrases and at least one fat soluble enzyme, wherein the mixture is formed as a coating on the plurality of cereal pieces.

11. The cereal food product of claim 10, wherein the at least two carbohydrases include cellulase and xylanase.

12. The cereal food product of claim 11, wherein the mixture further includes at least two additional soluble fiber enzymes.

13. The cereal food product of claim 12, wherein the at least two soluble fiber enzymes include pectinase and protease.

14. The cereal food product of claim 13, wherein the mixture includes cinnamon, cellulase, xylanase and pectinase.

15. The cereal food product of claim 10, wherein at least one of the at least two enzymes in the mixture is present as a deactivated enzyme.

16. The cereal food product of claim 15, wherein the cereal food product is a cereal piece and wherein the cereal piece is a marbit.

17. A cereal food product comprising:
a cereal composition including a plurality of ingredients combined with a mixture including cocoa and at least two enzymes including at least two carbohydrases including cellulase and xylanase, at least two additional, soluble fiber enzymes and at least one fat soluble enzyme, wherein at least one of the enzymes including the fat soluble enzyme is present as a deactivated enzyme.

* * * * *